UNITED STATES PATENT OFFICE.

JEAN BAPTISTE CANDAU AND AUGUSTE CANDAU, OF EAUX-BONNES, FRANCE.

MANUFACTURE OF LITHOPONES BY ELECTROLYSIS.

No. 868,253.  Specification of Letters Patent.  Patented Oct. 15, 1907.

Application filed April 3, 1905. Serial No. 253,725.

*To all whom it may concern:*

Be it known that we, JEAN B. CANDAU and AUGUSTE CANDAU, citizens of the French Republic, residing at Eaux-Bonnes, France, have invented certain new and useful Improvements in the Manufacture of Lithopones, of which the following is a full, clear, and exact description.

We use the natural sulfate of baryta, which being roasted with coal, gives sulfid of barium according to the reaction:

$$SO_4Ba + 4C = BaS + 4CO$$

This sulfid is lixiviated according to the ordinary methods.

We introduce a solution of sulfate of soda into suitable electrolytic vats divided into sections by porous diaphragms. Some of said sections are intended to contain the anodes, and the other sections to contain the cathodes. In the anodic sections are plates of zinc and in the cathodic sections plates of a metal not attacked by caustic soda. Both systems of plates are connected at their respective poles and a continuous current is sent through the system. Following reaction is produced:

$$SO_4Na_2 + Zn + 2H_2O = SO_4Zn + 2NaOH + 2H$$

After some time the whole of sulfate of soda is decomposed, and according to the reaction, in the anodic compartments there is a solution of sulfate of zinc and in the cathodic compartments a solution of caustic soda. The sulfate of zinc which is thus produced is precipitated by the sulfid of barium which was obtained before, and the white compound which results from such precipitation is the lithopone.

$$SO_4Zn + BaS = ZnS, SO_4Ba$$

If chlorid of soda instead of sulfate of soda is introduced into the electrolytic vats, with the same disposition of vats, and if the current is sent, following reaction is produced:

$$2(NaCl) + Zn + 2H_2O = ZnCl_2 + 2NaOH + 2H$$

In the anodic compartments will be the chlorid of zinc, and in the cathodic compartments the caustic soda.

The solution of chlorid of zinc which is thus obtained is mixed with a solution of sulfate of soda and the chlorid of zinc is precipitated by the sulfid of barium. The lithopone is thus produced and the chlorid of soda is regenerated. The following complex reaction takes place:

$$\begin{cases} BaS + ZnCl_2 = BaCl_2 + ZnS. \\ BaCl_2 + SO_4Na_2 = SO_4Ba + 2(NaCl). \end{cases}$$

The obtained lithopones are very white, and with this method the purification of the salts of zinc is not necessary. Metallic wastes from the various industries of zinc can be used as anodes.

Claim.—

The herein described process in the manufacture of lithopones which consists in producing a solution of sulfate of zinc and a solution of caustic soda electrolytically from sulfate of soda and metallic zinc and then precipitating the sulfate of zinc by sulfid of barium to produce the lithopone.

In testimony whereof they affix their signature in presence of two witnesses.

JEAN BAPTISTE CANDAU.
AUGUSTE CANDAU.

Witnesses:
EMILE COUCHOUD,
EDMOND LECOUTURIES.